US006914733B2

United States Patent
Dong et al.

(10) Patent No.: US 6,914,733 B2
(45) Date of Patent: Jul. 5, 2005

(54) CONFIGURATION OF AN OPTICAL ELEMENT IN THE OPTICAL PATH OF A LASER BEAM

(75) Inventors: Shalei Dong, Chur (CH); Martin Anrig, Sargens (CH); Robert Bessing, Igis (CH); Roland Wielnig, Bozen (IT); Christof Siebert, Chur (CH)

(73) Assignee: Trumpf Laser Marking Systems AG, Grusch (CH)

( * ) Notice: Subject to any disclaimer, the term of this patent is extended or adjusted under 35 U.S.C. 154(b) by 0 days.

(21) Appl. No.: 10/635,902

(22) Filed: Aug. 7, 2003

(65) Prior Publication Data

US 2004/0190165 A1 Sep. 30, 2004

(30) Foreign Application Priority Data

Apr. 24, 2003 (DE) .......................................... 203 06 411

(51) Int. Cl.$^7$ ................................................ G02B 7/02
(52) U.S. Cl. ........................ 359/819; 359/822; 359/823
(58) Field of Search ................................ 359/819, 822, 359/823

(56) References Cited

U.S. PATENT DOCUMENTS

| | | | | |
|---|---|---|---|---|
| 4,723,075 A | * | 2/1988 | German | .................. 250/231.14 |
| 5,061,841 A | * | 10/1991 | Richardson | ............ 219/130.01 |
| 5,825,562 A | | 10/1998 | Lai et al. | |
| 6,130,490 A | * | 10/2000 | Lee | .............................. 310/12 |
| 6,747,735 B2 | * | 6/2004 | Chen et al. | .................. 356/301 |
| 6,782,033 B2 | | 8/2004 | Ozasa | |

* cited by examiner

Primary Examiner—Ricky Mack
Assistant Examiner—Brandi N Thomas
(74) Attorney, Agent, or Firm—Fish & Richardson P.C.

(57) ABSTRACT

A system for prolonging the useful lifetime of an optical element upon which a laser is directed includes a holder adapted for mounting an optical element and a motor for rotating the holder upon which the optical element may be mounted such that when a laser beam impinges on the optical element, a point of impingement of the laser beam on the optical element is varied when the point of impingement of the laser beam on the optical element is radially separated from an axis of rotation of the optical element.

28 Claims, 1 Drawing Sheet

CONFIGURATION OF AN OPTICAL ELEMENT IN THE OPTICAL PATH OF A LASER BEAM

CLAIM OF PRIORITY

This application claims priority under 35 USC §119(a) to German patent application serial number DE 203 06 411.9, filed on Apr. 24, 2003, the entire contents of which are hereby incorporated by reference.

TECHNICAL FIELD

This invention relates to a configuration of an optical element in the optical path of a laser beam, and more particularly to a configuration in which the point at which the laser beam impinges onto the optical element is varied.

BACKGROUND

A configuration of the path of a laser beam and an optical element is disclosed in U.S. Pat. No. 5,825,562. In the configuration of U.S. Pat. No. 5,825,562, the lifetime of an optical element under laser irradiation is prolonged in that the optical element is gradually or continuously moved further in the laser beam to always use new regions of the optical element. The optical element is disposed such that it can be displaced in two directions perpendicular to each other, and is moved on a circular trajectory whose center simultaneously follows a spiral path. This configuration, however, requires a lot of construction effort and is susceptible to disturbances due to the large number of movable components.

SUMMARY

In a general aspect, a system for prolonging the useful lifetime of an optical element includes a holder adapted for mounting an optical element and a motor for rotating the holder upon which the optical element may be mounted such that when a laser beam impinges on the optical element, a point of impingement of the laser beam on the optical element is varied when the point of impingement of the laser beam on the optical element is radially separated from an axis of rotation of the optical element.

The invention may include one or more of the following features. The optical element may be continuously rotated. The optical element may be mounted to a rotatably disposed holder. The optical element may be glued onto the holder. The holder may have an outer edge upon which the optical element abuts and a depression in its center filled with adhesive. The optical element may project radially outwardly over the holder. The optical element may be mounted on the shaft of a rotary drive, and the rotary drive may be a stepper motor. The laser beam impinges on the optical element at an inclination angle, and the inclination angle may be approximately 45°. The optical element may reflect and also transmit the impinging laser beam. A transmitted beam, transmitted through the optical element, may be directed into a beam dump. The beam dump may be provided on a rear side of the optical element, and the beam dump may be distant from the optical element. The optical element may be a mirror. The mirror may have a dichroic coating, which reflects impinging ultraviolet radiation and transmits impinging visible and infrared radiation. The optical element may be mounted to a rotatably disposed holder, and the holder may be mounted on a rotary drive.

The details of one or more embodiments of the invention are set forth in the accompanying drawings and the description below. The features mentioned herein may be used individually or collectively in arbitrary combination. The embodiments shown and described are not to be understood as an exhaustive enumeration of all embodiments of the invention but rather as exemplary descriptions the general invention. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
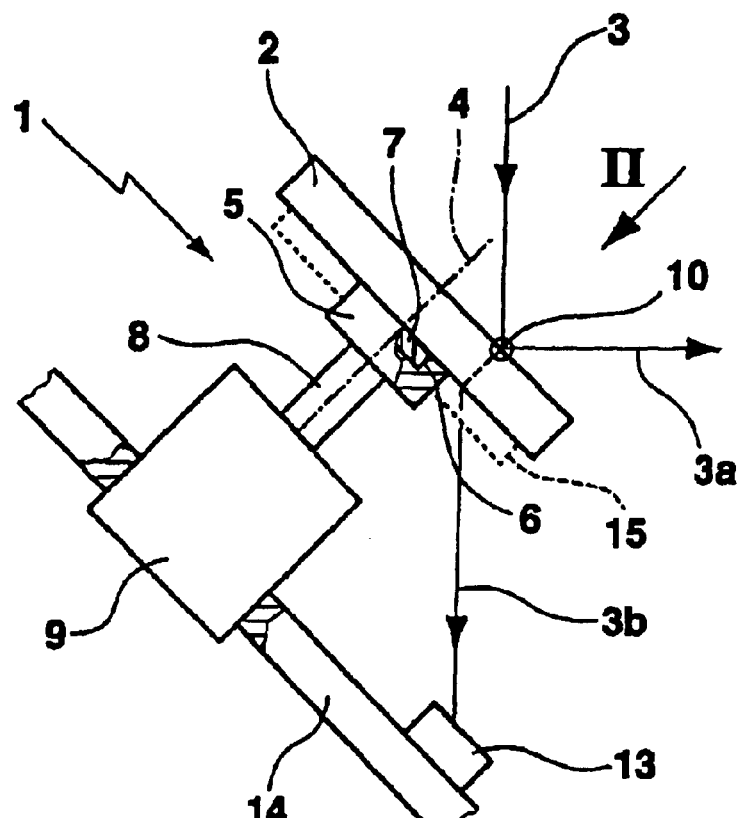
FIG. 1 is a side view of a configuration of an optical element in the optical path of a laser beam.

Referring to FIG. 1, a configuration 1 exists of an optical element 2 in the optical path of a laser beam 3. The optical element 2 may be a round mirror, which is disposed such that it can be rotated about its central axis 4 and is glued with its rear side to a holder 5. The holder 5 may have a raised outer edge where the mirror 2 abuts, and in its center a depression 6, which may be filled with an elastic adhesive 7. Because the mirror 2 can slide on the outer edge of the holder 5 due to the elasticity of the adhesive 7, thermal loads caused by the different thermal expansion coefficients of the mirror 2 and the holder 5 are reduced. The holder 5 may be mounted to the motor shaft 8 of a stepper motor 9, whose axis of rotation extends collinearly with the central axis 4 of the mirror 2. More specifically, the holder 5 may be a plug opening with three threaded bores displaced by 120° at its periphery. After plugging into the motor shaft 8, the holder 5 may be clamped to the motor shaft 8 by means of three set screws, which are screwed into the threaded bores and can be secured with adhesive after adjustment of the holder 5.

Figure 2:
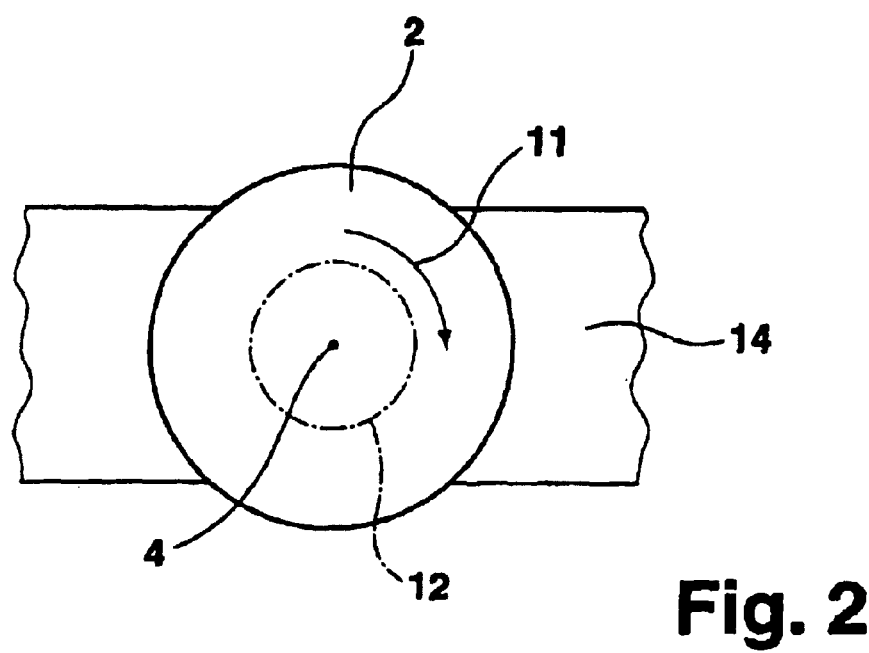
FIG. 2 is a top view onto the optical element in the direction II of FIG. 1.

The laser beam 3 may impinge on the mirror 2 at an angle of approximately 45°, wherein the point of impingement 10 of the laser beam 3 on the mirror 2 is radially separated from the axis of rotation 4 of the mirror 2. As shown in FIG. 2, the mirror 2 is gradually rotated (e.g., in predetermined time periods) in the direction of arrow 11, such that different points of impingement of the mirror 2 are exposed to the laser beam 3. The individual points of impingement lie on a circular trajectory 12 about the axis of rotation or central axis 4.

The mirror 2 may have a dichroic coating, which reflects impinging ultraviolet radiation and transmits impinging visible radiation and infrared radiation. Referring again to FIG. 1, the laser beam 3b transmitted through the mirror 2 is directed to a radiation dump 13, which is stationarily disposed on the base 14 of the stepping motor 9. The mirror 2 thereby projects radially to the outside over the holder 5 to such an extent that the transmitted laser beam 3b does not impinge on the holder 5. As an alternative to the stationary beam dump 13, a beam dump 15 may be provided also on the holder 5 as indicated with broken lines in FIG. 1.

The holder 5 may be adjusted on the motor shaft 8 by means of a visible directional laser with the aim that the staggering motion of the mirror 2 be as small as possible. This may ensure that further rotation of the mirror 2 does not change the optical path of reflected and transmitted rays 3a, 3b in space.

A number of embodiments of the invention have been described. Nevertheless, it will be understood that various modifications may be made without departing from the spirit and scope of the invention. Accordingly, other embodiments are within the scope of the following claims.

What is claimed is:

1. A system for prolonging the useful lifetime of an optical element upon which a laser beam is directed, the system comprising:
    a holder adapted for mounting an optical element; and
    a motor for rotating the holder about an axis of rotation, such that when the laser beam impinges on an optical element mounted on the holder at a point of impingement radially separated from the axis of rotation, the point of impingement of the laser beam on the optical element is varied in a continuous circular path on the optical element as the motor rotates the holder.

2. The system of claim 1, wherein the motor is adapted for rotating continuously the holder.

3. The system of claim 1, further comprising an optical element mounted to a rotable optical element holder.

4. The system of claim 3, wherein the optical element is glued onto the holder.

5. The system of claim 3, wherein the holder has an outer edge upon which the optical element abuts and a depression in its center filled with adhesive.

6. The system of claim 3, wherein the optical element projects radially outwardly over the holder.

7. The system of claim 1, wherein the motor is a stepper motor.

8. The system of claim 1, wherein the laser beam impinges on the optical element at an inclination angle.

9. The system of claim 8, wherein the inclination angle is approximately 450°.

10. The system of claim 3, wherein the optical element reflects a portion of the impinging laser beam and transmits a portion of the impinging beam.

11. The system of claim 10, further comprising a beam dump, and wherein a transmitted beam, transmitted through the optical element, is directed into the beam dump.

12. The system of claim 11, wherein the beam dump is provided on a rear side of the optical element.

13. The system of claim 12, wherein the beam dump is mechanically separate from the optical element.

14. The system of claim 3, wherein the optical element is a mirror.

15. The system of claim 14, wherein the mirror has a dichroic coating, which reflects impinging ultraviolet radiation and transmits impinging visible and infrared radiation.

16. The system of claim 3, wherein the optical element projects radially outwardly over the holder, and wherein the optical element is a mirror.

17. The system of claim 3, wherein the laser beam impinges on the optical element at an inclination angle, and wherein the optical element is a mirror.

18. The system of claim 17, wherein the inclination angle is approximately 45°.

19. The system of claim 3, wherein the optical element reflects and also transmits the impinging laser beam, and wherein the optical element is a mirror.

20. The system of claim 3, wherein the axis of rotation is the central axis of the optical element, wherein the motor is adapted for rotating continuously the holder upon which the optical element may be mounted, wherein the optical element is glued onto the holder, wherein the holder has an outer edge upon which the optical element abuts and a depression in its center filled with adhesive, wherein the optical element projects radially outwardly over the holder, wherein the laser beam impinges on the optical element at an inclination angle of approximately 450°, wherein the optical element reflects and also transmits the impinging laser beam, wherein the transmitted beam is directed into a beam dump provided on a rear side of the optical element, or into a stationary beam trap, wherein the optical element is a mirror and wherein the mirror has a dichroic coating, which reflects impinging ultraviolet radiation and transmits impinging visible radiation and infrared radiation.

21. A method of prolonging the useful lifetime of an optical element, the method comprising:
    shining a laser beam on an optical element at a point of impingement on the optical element that is radially separated from an axis of rotation of the optical element; and
    rotating the optical element about the axis of rotation, such that the point of impingement of the laser beam on the optical element is varied in a continuous circular path on the optical element because the point of impingement is radially separated from the axis of rotation of the optical element.

22. The method of claim 21, wherein the optical element is rotated continuously.

23. The method of claim 21, wherein the optical element is rotated by a stepper motor.

24. The method of claim 21, further comprising shining the laser beam on the optical element at an inclination angle to a surface of the optical element.

25. The method of claim 24, wherein the inclination angle is approximately 450°.

26. The method of claim 21, wherein the optical element reflects a portion of the impinging laser beam and transmits a portion of the impinging beam.

27. The method of claim 26, wherein a transmitted beam, transmitted through the optical element, is directed into a beam dump.

28. The method of claim 21, wherein the optical element is a mirror, and wherein the mirror has a dichroic coating, which reflects impinging ultraviolet radiation and transmits impinging visible and infrared radiation.

* * * * *